United States Patent
Wimer et al.

(10) Patent No.: US 8,801,887 B2
(45) Date of Patent: Aug. 12, 2014

(54) TEXTURED STRUCTURE AND METHOD OF MAKING THE TEXTURED STRUCTURE

(75) Inventors: Brian J. Wimer, Bothell, WA (US); J. Christopher Wilde, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 1017 days.

(21) Appl. No.: 11/317,843

(22) Filed: Dec. 23, 2005

(65) Prior Publication Data

US 2007/0148410 A1    Jun. 28, 2007

(51) Int. Cl.
*B29C 53/04* (2006.01)

(52) U.S. Cl.
USPC ............................ 156/212; 156/277; 156/285

(58) Field of Classification Search
None
See application file for complete search history.

(56) References Cited

U.S. PATENT DOCUMENTS

| | | | | |
|---|---|---|---|---|
| 3,905,849 | A | * | 9/1975 | Bomboire ...................... 156/79 |
| 4,127,436 | A | * | 11/1978 | Friel ............................ 430/315 |
| 4,693,926 | A | * | 9/1987 | Kowalski et al. ............ 428/204 |
| 5,296,340 | A | * | 3/1994 | Tsukada et al. .............. 430/394 |
| 5,346,571 | A | * | 9/1994 | Condon et al. ............... 156/212 |
| 5,779,779 | A | | 7/1998 | Jolly |
| 5,942,330 | A | | 8/1999 | Kelley |
| 6,326,419 | B1 | | 12/2001 | Smith |
| 2002/0084975 | A1 | | 7/2002 | Lin |

FOREIGN PATENT DOCUMENTS

| | | |
|---|---|---|
| DE | 2544553 | 4/1976 |
| DE | 69015489 T2 | 8/1995 |
| DE | 6950924 T2 | 12/1999 |
| EP | 0192218 A2 | 8/1986 |
| EP | 0568052 A2 | 11/1993 |
| JP | 53094571 A | 8/1978 |
| JP | 2158342 A | 6/1990 |

OTHER PUBLICATIONS www.thefreedictionary.com/ink.*
3M United States, Dyneon™ Fluorothermoplastics (FTPs) FAQs, printed from 3M website—http://cms.3m.com/cms/US/en/2-86/cRccFFK/view.jhtml ; printed on Dec. 13, 2005, 4 pages.
3M United States, Product Catalog for Dyneon™ Fluoropolymer Eastomers and Resins, Dyneon™ THV Fluorothermoplastic, printed from 3M website: http://www.3m.com/US/, printed Dec. 23, 2005, 3 pages.
DuPont™ Tedlar® PVF Film, product description 2005, printed from DuPont website: http://www.dupont.com/tedlar, printed on Dec. 8, 2005, 1 page.
Annex to Opposition for EP Application No. 06 256 137.8 dated Apr. 26, 2013.
European Search Report from EP 1800860 dated Mar. 29, 2007.
GB1517302A as the English language translation of DE2544553, dated Jul. 12, 1978.

* cited by examiner

*Primary Examiner* — Barbara J Musser
(74) *Attorney, Agent, or Firm* — Klintworth & Rozenblat IP LLC

(57) ABSTRACT

The present application is directed to textured surfaces and methods for forming textured surfaces. The textured surfaces of the present application comprise a conformable film, which conforms to a texture pattern. In certain embodiments, the texture pattern comprises inks having a desired thickness. The methods of the present application may be used to form textured surfaces for a variety of applications, including, for example, aircraft having at least one interior panel with a textured surface.

8 Claims, 3 Drawing Sheets

TEXTURED STRUCTURE AND METHOD OF MAKING THE TEXTURED STRUCTURE

BACKGROUND

The present application is directed to textured surfaces and methods for forming textured surfaces.

Decorative laminates having textured surfaces are employed in various applications, such as, for example, for providing ornamentation of the interior panels of aircrafts. The textured surface not only enhances the appearance of the laminate, but may also provide other benefits, such as the ability to hide scuff marks. In the case of aircraft manufacturing, airlines may wish to include raised logos or other identifying marks as part of the texture of a laminate for branding purposes. Thus, having a wide variety of textures from which to choose and/or the ability to customize textured surfaces can be desirable.

In the past, texturing of decorative laminates has been achieved using various processes which employ texturing mediums, such as steel rolls or plates, to provide texture. The steel rolls and steel plates used in these processes can be expensive to manufacture, and may require a long lead-time of several months to fabricate. For these reasons, offering a large variety of textures, or customization of textures for a particular customer may not be feasible.

In addition, such texturing processes often employ embossing resins in the laminates in order to achieve the desired texture. The embossing resins increase the amount of material used to fabricate the laminate, which can increase the heat release rating of the laminate. In some applications, such as the manufacture of certain aircraft, it may be desirable to employ less material in order to reduce the heat release rating of the laminate.

BRIEF DESCRIPTION

One or more of the above-mentioned drawbacks associated with existing laminate texturing processes may be addressed by embodiments of the present invention, which will be understood by reading and studying the following specification.

One embodiment of the present application is directed to a method of forming a textured surface. The method comprises providing a film having a first major surface and an opposing second major surface. A texture pattern is deposited on the first major surface of the film, the texture pattern comprising a material having a desired thickness. The first major surface of the film is bonded to a substrate. The film is subjected to a temperature and pressure sufficient to cause the film to deform around the textured pattern to form a textured surface, the textured surface comprising raised surface portions and lower surface portions of the second major surface.

Another embodiment of the present application is directed to an aircraft having at least one interior panel with a textured surface. The interior panel comprises a texture pattern comprising ink having a desired thickness, and a conformable film adjacent to the textured pattern. The conformable film conforms to the texture pattern to form a textured surface comprising raised surface portions and lower surface portions of a major surface of the conformable film.

Another embodiment of the present application is directed to a method of forming a textured surface. The method comprises providing a first film having a first major surface. A texture pattern is deposited on the first major surface of the film, the texture pattern comprising a material having a first thickness. A second film is applied over the texture pattern. The second film is subjected to a temperature and pressure sufficient to cause the second film to deform around the textured pattern to form a textured surface comprising raised surface portions and lower surface portions of a major surface of the second film.

These and other embodiments of the present application will be discussed more fully in the detailed description. The features, functions, and advantages can be achieved independently in various embodiments of the present application, or may be combined in yet other embodiments.

DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1A:
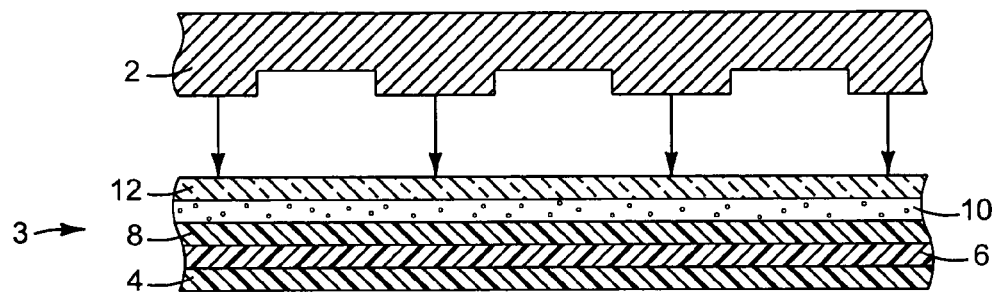
FIGS. 1A and 1B illustrate a related art process for imparting texture to laminates.
Figure 1B:
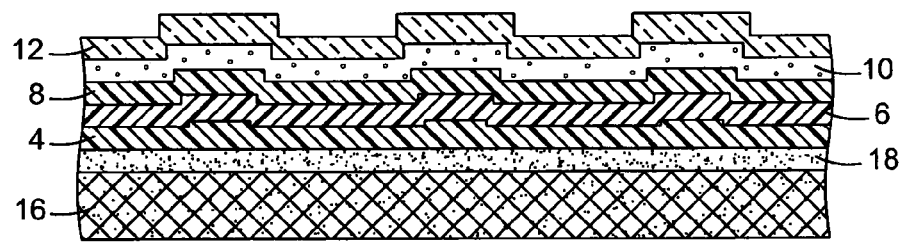

As described above, texturing of decorative laminates has been achieved in the past using various processes, such as textured roll processing or textured press processing. In these processes, steel rolls or plates are employed to provide texture. One such textured press processing technique is illustrated in FIG. 1. FIG. 1A illustrates texture blanket 2, which has been imparted with a desired texture using a textured steel plate (not shown). Textured blanket 2 can be used to impart texture to a laminate 3, which may comprise, for example, opaque poly vinyl fluoride (PVF) layers 4 and 8, an embossing resin 6, ink layer 10 for imparting color to the laminate, and a clear PVF layer 12. The layers of laminate 3 are placed in a press, along with textured blanket 2, and heat and pressure are applied to impart the texture of texture blanket 2 to laminate 3, as illustrated in FIG. 1B.

Figure 2A:
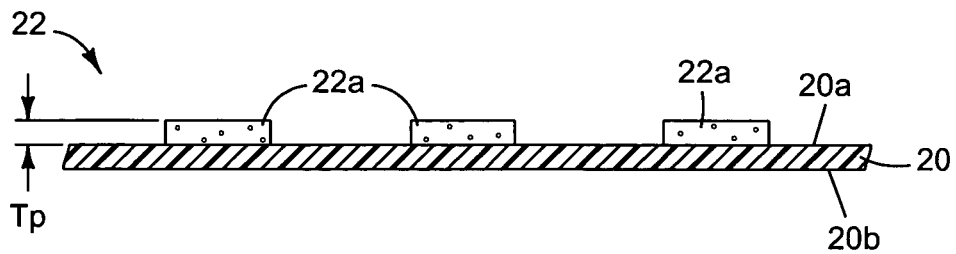
FIGS. 2A to 2C illustrate a process for imparting texture to laminates using a printed texture pattern, according to one embodiment of the present application.
Figure 2B:
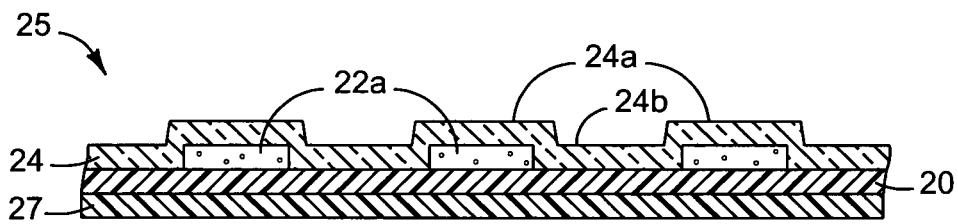
Figure 2C:
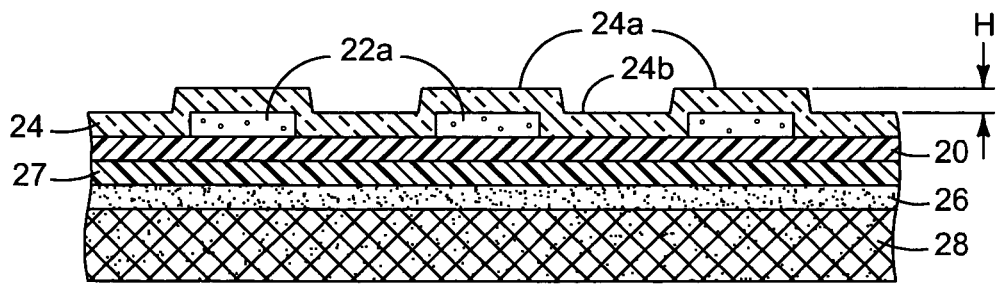

FIGS. 2A to 2C illustrate a process for imparting texture to laminates using a texture pattern, according to one embodiment of the present application. FIG. 2A illustrates a first film 20 on which texture pattern 22 is formed. Film 20 comprises a first major surface 20a and a second major surface 20b. Film 20 may comprise any film suitable for use in a laminate structure, including films well known in the art for use in decorative laminates. In one embodiment, film 20 may comprise fluoropolymers, such as, for example, poly vinyl fluoride (PVF). One example of a suitable PVF film which is commercially available is Tedlar®, which is commercially available from DuPont. Other examples of suitable fluoropolymers include Dyneon™ THV, which are a family of fluoroplastics comprising monomers of tetrafluoroethylene, hexafluoropropylene and vinylidene fluoride, available from Dyneon, a 3M company.

Film 20 may be any suitable thickness. In one embodiment, the thickness of film 20 may range from about 0.5 mil to about 10 mils. In another embodiment, the thickness of film 20 may range from about 1 mil to about 4 mils, such as, for example, about 2 mils.

Texture pattern 22 may be formed by depositing a material on film 20. Texture pattern 22 may have any desired shape or design, which would result in a textured surface. In the illustrated embodiment, texture pattern 22 comprises a plurality of discrete structures 22a having a thickness $T_p$. Thickness, $T_p$, may be chosen to result in a desired texture height, H, of raised portions 24a of the finished textured surface, as illustrated in FIG. 2C. In one embodiment, $T_p$ may be about 0.8 mil or greater. For example, $T_p$ may range from about 1 mil to about 3 mils.

Texture pattern 22 may comprise any suitable material and may be deposited using any suitable deposition technique. In one embodiment, texture pattern 22 comprises ink and is deposited using a printing process. Any suitable printing process may be employed, such as, for example, silk screening or digital printing. Both silk screening and digital printing processes are well known in the art.

Any suitable ink may also be employed. For example, aqueous and non-aqueous based inks, including UV curable screen inks, which are well known in the art, may be employed. The ink may be clear, translucent, or opaque, and have any desired color. In certain embodiments, various properties of the ink, such as viscosity, may be adjusted to aid in providing the desired thickness, $T_p$, of the ink, while preventing the ink from substantially flowing once it is deposited so as to maintain the desired texture pattern. The ink may include one or more additives, examples of which include toners, hardeners, and fillers, such as pearl powders and metal powders.

The textured structure of FIG. 2A may be used to form a laminate comprising any desired number of films laminated together. FIG. 2B shows one embodiment of a laminate 25, comprising a conformable film 24 formed on textured pattern 22 and film 20, as well as one or more optional films 27.

The phrase "conformable film" refers to a film capable of substantially conforming to the underlying surface to which it is applied so that the exposed surface of the conformable film substantially mimics the topology of the underlying surface. Thus, conformable film 24 is capable of substantially conforming to the textured pattern 22 and the exposed portions of the first major surface of film 20, in order to form a textured surface.

Conformable film 24 may comprise any material suitable for use in a laminate structure, which is capable of forming a conformal film, including materials well known in the art for use in laminate structures. In some embodiments, conformable film 24 may comprise a fluoropolymer, such as, for example, poly vinyl fluoride (PVF) or Dyneon™ THV, described above. Conformable film 24 may be any suitable color and may be opaque, translucent or clear.

In certain embodiments, conformable film 24 may comprise an adhesive formed on at least one major surface for bonding to the structure of FIG. 2A. In other embodiments, conformable film 24 does not include an adhesive.

Conformable film 24 may be any suitable thickness. In one embodiment, the thickness of conformable film 24 may range from about 0.2 mil to about 3 mils. In another embodiment, the thickness of conformable film 24 may range from about 0.5 mil to about 1 mil.

Conformable film 24 may be formed by applying a film of the desired material on texture pattern 22, and providing temperature and pressure conditions sufficient to cause the conformable film 24 to deform around structures 22a to form a textured surface comprising raised surface portions 24a and lower surface portions 24b of conformable film 24. The temperature and pressure conditions which cause conformable film 24 to deform around structures 22a may be provided during a lamination process and/or a subsequent bonding process, both of which processes will be described below. Thus in certain embodiments, part of the deformation of conformable film 24 occurs during the lamination process, and then additional deformation occurs during the bonding process. In other embodiments, all or substantially all of the deformation of conformable film 24 occurs in either the lamination process or the bonding process.

The pressure and temperature conditions may be chosen based on the materials used in the laminate structure. In one exemplary embodiment, pressures may range from about 50 psi to about 150 psi and temperatures may range from about 200° F. to about 400° F. In another exemplary embodiment, pressures may range from about 90 psi to about 100 psi and temperatures may range from about 250° F. to about 300° F.

In one embodiment, the heat and pressure may be applied using a heat press lamination process. In this embodiment, the films of the laminate are placed in a heat press and laminated together using heat and pressure applied by the press. In another embodiment, the lamination may be accomplished using a roll process, in which the films are heated and fed through a roller, which provides the desired pressure for lamination. Such press and roll processes are well known in the art.

As mentioned above, and illustrated in FIG. 2C, raised surface portions 24a have a height, H, relative to lower surface portions 24b of conformable film 24. In some embodiments, H may be approximately equal to the thickness, $T_p$, of texture pattern 22. In one illustrative embodiment, H may be about 0.8 mil or greater. For example, H may range from about 1 mil to about 3 mils.

After laminate 25 of FIG. 2B is formed, it may then be bonded to a desired substrate 28, as illustrated in FIG. 2C, using any suitable process. For example, in the illustrated embodiment, a bonding adhesive 26 is employed to bond laminate 25 to substrate 28 at suitable temperature and pressure conditions so that the laminate conforms to the surface of substrate 28. In certain embodiments, as discussed above, conformable film 24 may deform around the textured pattern 22 during the bonding process to form the textured surface. The deformation which occurs during the bonding process may be in addition to deformation which occurs during the lamination process.

One such exemplary bonding process is a well known process for applying laminates to substrates using a vacuum tool which allows a vacuum to be created between a laminate and a substrate. In this process, substrate 28 is positioned in the vacuum tool and laminate 28 is clamped in the vacuum tool creating a vacuum seal. Heat is then applied using, for example, convection or infrared heat sources, until laminate 25 reaches a desired temperature. The vacuum is then applied, which pulls the laminate onto bonding adhesive 26 on substrate 28, thereby bonding laminate 25 to substrate 28. Temperatures for this embodiment may range, for example, from ambient (e.g., about 70° F.) to about 400° F., such as from about 200° F. to about 350° F. Pressures may range, for example, from about 8 inches Hg to about 25 inches Hg.

Substrate 28 may comprise any suitable material having any desired size or shape. Examples may include any flat, simple or complex contoured part made from wood, plastics or composite materials. In one embodiment, substrate 28 is an interior panel of an aircraft, such as a sidewall panel, ceiling panel, closet panel, partition panel, or stow bin panel.

In one embodiment according to FIG. 2C, film 20 is opaque in order to cover up and provide a decorative surface to underlying substrate 28, while conformable film 24 is clear, which allows texture pattern 22 to be viewed through conformable film 24. The ink pattern may comprise one or more desired colors. In this manner, laminate 25 may provide an aesthetically pleasing colored and textured surface to substrate 28.

Figure 3A:
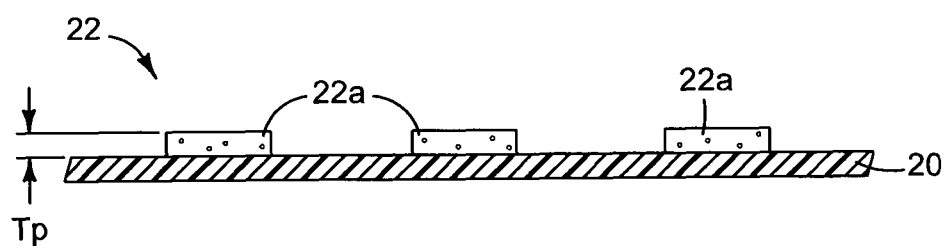
FIGS. 3A to 3B illustrate a process for imparting texture to laminates using a printed texture pattern, according to another embodiment of the present application.
Figure 3B:
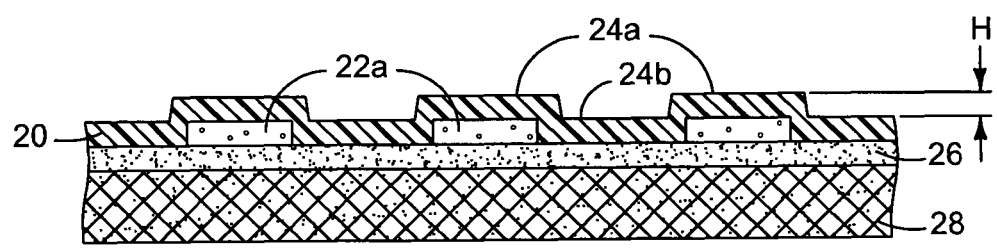

FIGS. 3A and 3B illustrate another embodiment of the present application. In this embodiment, texture pattern 22 is formed on a first major surface of conformable film 24. Conformable film 24 may comprise any material suitable for use in a laminate structure, which is capable of forming a conformable film, including materials well known in the art for use in laminate structures. In one embodiment, conformable film 24 may comprise a fluoropolymer, such as, for example, poly vinyl fluoride (PVF) or Dyneon™ THV, described above. One example of a suitable PVF film which is commercially available is Tedlar®, which is made by DuPont.

Conformable film 24 may be any suitable thickness. In one embodiment, the thickness of conformable film 24 may range from about 0.2 mil to about 5 mils. In another embodiment, the thickness of conformable film 24 may range from about 0.5 mil to about 2 mil. Conformable film 24 may be any suitable color and may be opaque, translucent or clear.

Texture pattern 22 is formed by depositing a suitable material on conformable film 24, similarly as discussed above. Texture pattern 22 may have any desired shape or design. In the illustrated embodiment, texture pattern 22 comprises a plurality of discrete structures 22a having a thickness $T_p$. Thickness, $T_p$, may be chosen to result in a desired height, H, of raised portions of the finished textured surface, as illustrated in FIG. 3B. In one embodiment, $T_p$ may be about 0.8 mil or greater. For example, $T_p$ may range from about 1 mil to about 3 mils.

Texture pattern 22 may comprise any suitable material and may be deposited using any suitable deposition technique. In one embodiment, texture pattern 22 comprises ink and is formed using a printing process. Any suitable printing process, including those listed above in the FIG. 2 process, may be employed, such as, for example, silk screening or digital printing. Silk screening and digital printing processes are well known in the art.

Any suitable ink may also be employed. For example, aqueous and non-aqueous based inks, including UV curable screen inks, which are well known in the art, may be employed. The ink may be clear, translucent, or opaque, and have any desired color. In certain embodiments, various properties of the ink, such as viscosity, may be adjusted to aid in providing the desired thickness, $T_p$, of the ink, while preventing the ink from substantially flowing once it is deposited so as to maintain the desired texture pattern. The ink may include one or more additives, examples of which include toners, hardeners, and fillers, such as pearl powders and metal powders.

After texture pattern 22 is formed, both textured pattern 22 and the first major surface of conformable film 24 are bonded to a desired substrate 28, as illustrated in FIG. 3B. Substrate 28 may comprise any suitable substrate, including the interior panel of an aircraft, as discussed above in the FIG. 2 embodiment.

In the illustrated embodiment, bonding is accomplished using a bonding adhesive 26, although any suitable bonding technique may be employed. In one embodiment, conformable film 24 is subjected to temperature and pressure conditions during the bonding process which are sufficient to cause the conformable film 24 to deform around structures 22a to form a textured surface comprising raised surface portions 24a and lower surface portions 24b of conformable film 24. The pressure and temperature conditions may be chosen based on the materials used in the laminate structure.

In one embodiment, the bonding process is a well known process for applying laminates to substrates, similarly as described above with respect to the FIG. 2 embodiment. In this process, substrate 28 is positioned in the vacuum tool and conformable film 24 is clamped in the vacuum tool creating a vacuum seal. Heat is then applied using, for example, convection or infrared heat sources, until conformable film 24 reaches a desired temperature. The vacuum is then applied, which pulls conformable film 24 onto bonding adhesive 26 on substrate 28, thereby bonding conformable film 24 and texture pattern 22 to substrate 28. Temperatures for this embodiment may range, for example, from ambient (e.g., about 70° F.) to about 400° F., such as from about 200° F. to about 350° F. Pressures may range, for example, from about 8 inches Hg to about 25 inches Hg.

Raised surface portions 24a have a height, H, relative to lower surface portions 24b of conformable film 24, similarly as discussed above. In one embodiment, H may be approximately equal to the thickness of, $T_p$, of texture pattern 22. For example, H may be about 0.8 mil or greater. In one illustrative embodiment, H may range from about 1 mil to about 3 mils.

In one embodiment of the FIG. 3 process, conformable film 24 is preferably translucent, and texture pattern 22 comprises a colored ink pattern, which may include one or more desired colors. In this embodiment, the one or more desired colors show through the translucent conformable film 24, so that they are at least partially visible to the naked eye. In certain embodiments, the colored pattern showing through translucent conformable film 24 may provide a perceived sense of texture, in addition to the physical texture of the textured surface. Similarly, a translucent conformable film 24 in combination with a colored ink pattern may also be employed in the embodiment of FIG. 2, described above.

In the processes of the present application, as described above, textures are provided using texture patterns, such as printed ink patterns, which become part of the textured surface. This eliminates the need to use other textured mediums, including textured steel rolls, textured steel plates, or pattern blankets, which do not become part of the textured surface. It also eliminates the need to use certain materials commonly employed in textured laminates, such as embossing resins. However, the texturing methods of the present application may be used in combination with such textured mediums, as well as with laminates employing materials such as embossing resins, if desired, in order to form, for example, textured laminates, as would be appreciated by one of ordinary skill in the art.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A method of forming a laminate having a textured surface, wherein the laminate consists of: a first film having a first major surface; a texture pattern deposited on the first major surface of the first film, the texture pattern comprising an ink having a first thickness and deposited by a digital printing process; and a conformable film applied over the texture pattern and deformed around the texture pattern to form the textured surface comprising raised surface portions and lower surface portions of a major surface of the conformable film, the method comprising:

provide the first film having the first major surface;

depositing the texture pattern comprising the ink having the first thickness on the first major surface of the first film using the digital printing process;

applying the conformable film over the texture pattern;

subjecting the conformable film to a temperature and pressure sufficient to cause the conformable film to deform around the texture pattern to form the textured surface comprising the raised surface portions and the lower surface portions of the major surface of the conformable film; and bonding the laminate to an aircraft panel by deforming the conformable film around the texture pattern a second time to form the textured surface.

2. The method of claim 1 further comprising the ink forming a colored texture pattern which shows through the conformable film so as to be at least partially visible to a naked eye.

3. The method of claim 1 wherein the first thickness of the ink is at least 0.03 mm (1 mil).

4. The method of claim 1 wherein the temperature is in a range from 93° C. (200° F.) to 204° C. (400° F.), and the pressure is in a range from 0.345 MPa (50 psi) to 1.034 MPa (150 psi).

5. The method of claim 1 wherein the bonding the laminate to the aircraft panel comprises subjecting the laminate to a bonding temperature while employing a vacuum to cause the laminate to bond to the aircraft panel.

6. A method of forming a laminate having a textured surface, wherein the laminate consists of: a first film having a first surface; a colored texture pattern deposited on the first surface of the first film, the colored texture pattern comprising an ink having a first thickness deposited by a digital printing process; and a conformable film applied over the texture pattern and deformed around the texture pattern forming the textured surface comprising raised surface portions and lower surface portions of a surface of the conformable film, the method comprising:

providing the first film having the first surface;

depositing the colored texture pattern comprising the ink having the first thickness on the first surface of the first film using the digital printing process;

applying the conformable film over the colored texture pattern so that the colored texture pattern shows through the conformable film so as to be at least partially visible to a naked eye;

subjecting the conformable film to a temperature and pressure sufficient to cause the conformable film to deform around the colored texture pattern to form the textured surface comprising the raised surface portions and the lower surface portions of the surface of the conformable film; and bonding the laminate to an aircraft panel by subjecting the laminate to a bonding temperature while employing a vacuum and deforming the conformable film around the colored texture pattern a second time to form the textured surface.

7. The method of claim 6 wherein the temperature is in a range from 93° C. (200° F.) to 204° C. (400° F.), and the pressure is in a range from 0.345 MPa (50 psi) to 1.034 MPa (150 psi).

8. The method of claim 7 wherein the first thickness of the ink is at least 0.03 mm (1 mil).

* * * * *